(12) United States Patent
Thorp

(10) Patent No.: US 7,225,904 B2
(45) Date of Patent: Jun. 5, 2007

(54) REINFORCED BRAKE LINING AND METHOD OF PRODUCING

(75) Inventor: John H. E. Thorp, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 11/051,704

(22) Filed: Feb. 4, 2005

(65) Prior Publication Data
US 2006/0175162 A1 Aug. 10, 2006

(51) Int. Cl.
*F16D 69/00* (2006.01)
(52) U.S. Cl. ............. 188/251 M; 188/255; 188/251 A; 188/250 G
(58) Field of Classification Search ................ 188/255, 188/257, 258, 251 A, 251 M, 250 G
See application file for complete search history.

(56) References Cited

U.S. PATENT DOCUMENTS

| 1,890,425 | A | * | 12/1932 | Whitworth .............. 188/250 R |
| 2,599,826 | A | * | 6/1952 | Halstead et al. ............ 138/174 |
| 3,870,581 | A | * | 3/1975 | Afflerbach et al. ......... 156/192 |
| 4,278,153 | A | | 7/1981 | Venkatu |
| 4,728,552 | A | * | 3/1988 | Jensen, Jr. ................... 428/91 |
| 4,997,067 | A | * | 3/1991 | Watts ..................... 188/251 A |
| 5,114,769 | A | * | 5/1992 | Kani et al. .................... 428/37 |
| 6,013,146 | A | | 1/2000 | Yuan et al. |
| 6,530,458 | B1 | * | 3/2003 | Rau, III .................. 188/218 R |

* cited by examiner

*Primary Examiner*—Devon Kramer
(74) *Attorney, Agent, or Firm*—Kathleen K. Bowen

(57) ABSTRACT

A method of producing a brake lining assembly having a wear surface with increased wear characteristics comprises the steps of winding a metal strip, placing the wound metal strip into a brake lining cup, filling the brake lining cup with a brake lining material of powdered metal and then sintering the powdered metal thus embedding the wound metal strip into the brake lining material, forming a brake lining assembly. The metal strip has a width approximately equal to that of the brake lining assembly desired depth, and is wound into a shape and size which will fit into the brake lining cup. The wound metal strip is then placed into the brake lining cup such that the metal strip width is approximately perpendicular to the brake lining wear surface. Alternatively the wound metal strip may be produced by extrusion. The result is a brake lining assembly which is reinforced by a metallic winding structure.

14 Claims, 4 Drawing Sheets

REINFORCED BRAKE LINING AND METHOD OF PRODUCING

BACKGROUND

The present invention is in the field of braking systems. More specifically this invention relates to the brake linings for use in a braking disc.

Modern steel brake designs rely on the friction generated between solid steel and sintered metal wear surfaces. The steel surface may take the form of a full annular disc, or may be segmented and connected, with or without a substructure, to form a full annular disc. The sintered metal components are lower in strength, and therefore require a different method of assembly than the steel components.

Modern steel aircraft brakes are typically created by adding powdered metal to formed cups, and then sintering this powdered metal to fuse it to the cups. Brake linings have been shown to wear less when surface temperatures are kept low. Unfortunately, powdered metal compounds act as good insulators, thereby retaining surface heat, which causes increased wear.

Prior methods of brake pad reinforcement have provided some heat dissipation. In U.S. Pat. No. 4,278,153, to Venkatu, a brake reinforcement method is disclosed. This method comprises reinforcing the brake pad with a grid of copper or steel. U.S. Pat. No. 6,013,146 to Yuan et al also discloses a honeycomb/grid type reinforcement method. This would provide some heat dissipation, however, this grid can be difficult and expensive to manufacture.

A method of heat dissipation is desired for brake pads which would be easier and more economical to produce.

SUMMARY OF INVENTION

A method of producing a brake lining assembly having a wear surface with increased wear characteristics comprises the steps of winding a metal strip, placing the wound metal strip into a brake lining cup, filling the brake lining cup with a brake lining material of powdered metal and then sintering the powdered metal thus embedding the wound metal strip into the brake lining material, forming a brake lining assembly. The metal strip has a width approximately equal to that of the brake lining material desired depth, and is wound into a shape and size which will fit into the brake lining cup. The wound metal strip is then placed into the brake lining cup such that the metal strip width is approximately perpendicular to the brake lining wear surface. Alternatively the wound metal strip may be produced by extrusion. The result is a brake lining assembly which is reinforced by a metallic winding structure.

DETAILED DESCRIPTION

Figure 1:
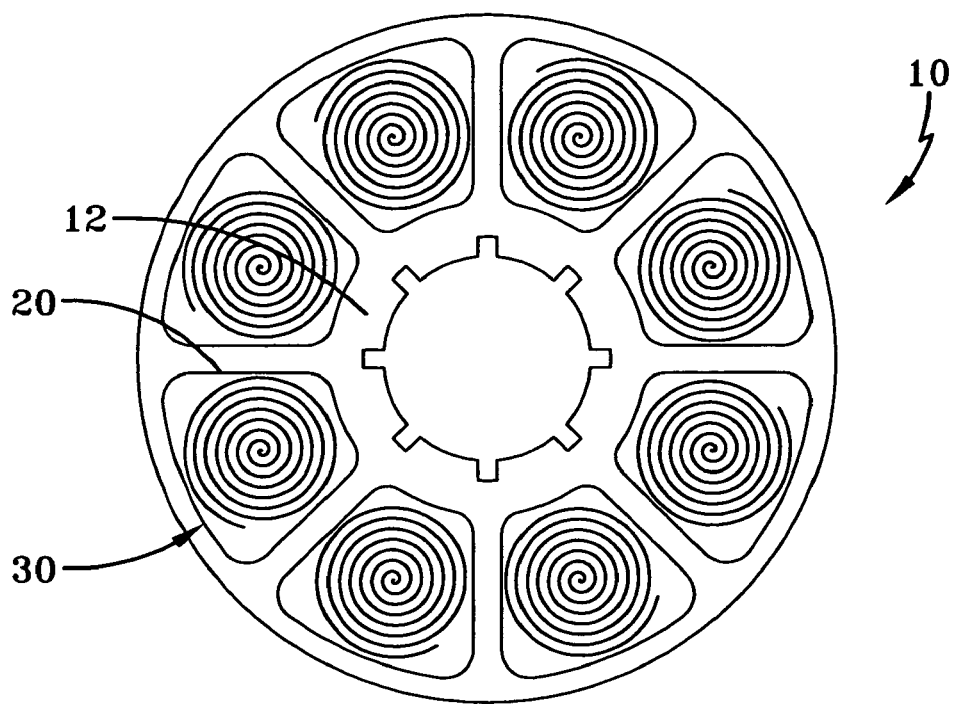
FIG. 1 is a cross sectional view of a brake disc according to an aspect of the invention.
Figure 2:
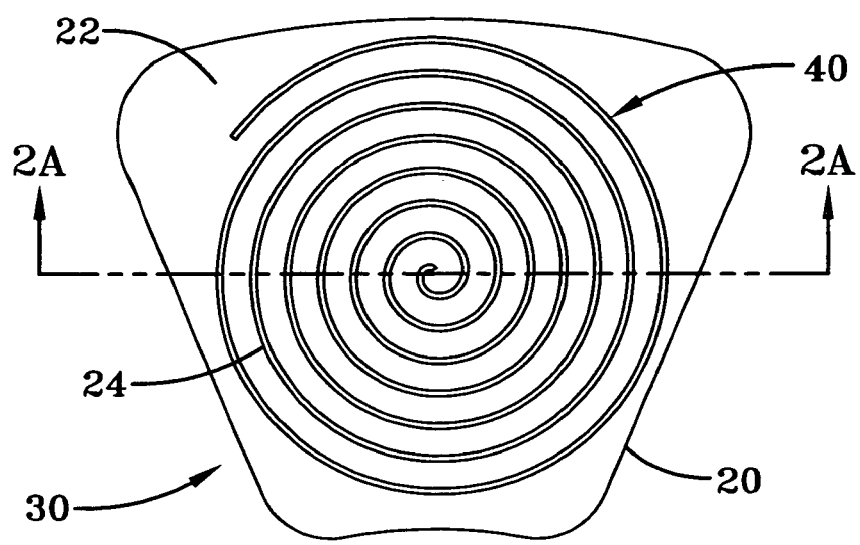
FIG. 2 is a top view of a brake lining assembly according to an aspect of the invention.
Figure 2A:
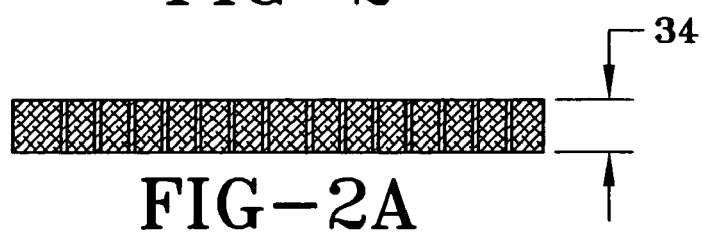
FIG. 2A is the cross section view of FIG. 2.
Figure 3:
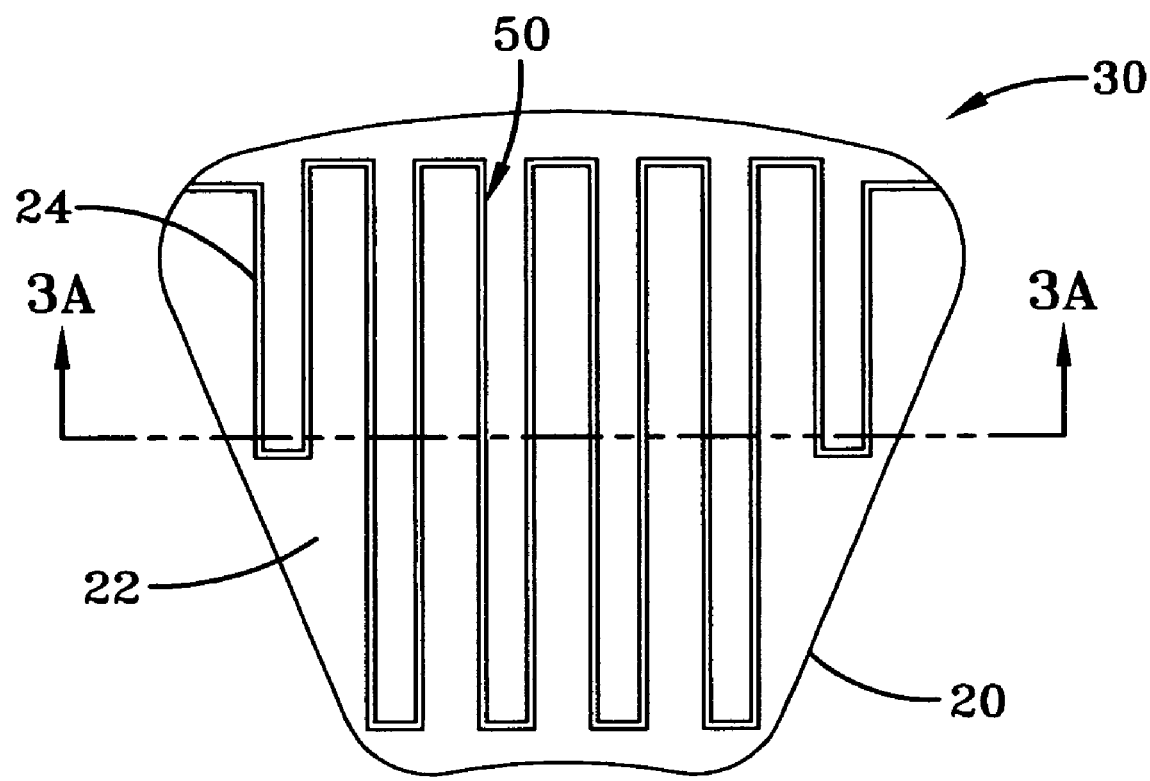
FIG. 3 is a top view of a brake lining assembly according to an aspect of the invention.
Figure 3A:
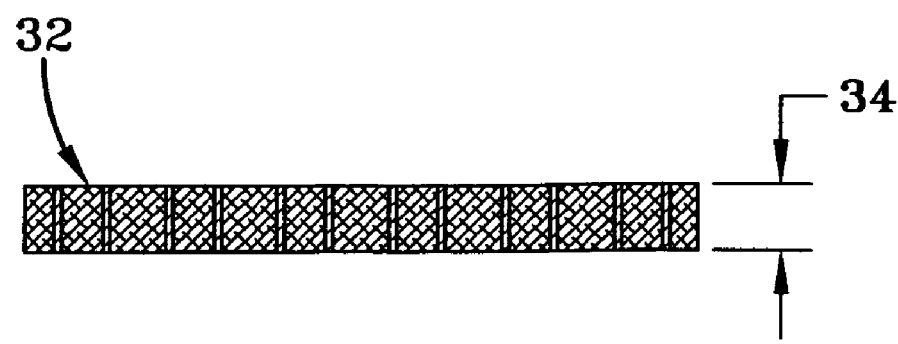
FIG. 3A is the cross section view of FIG. 2.
Figure 4:
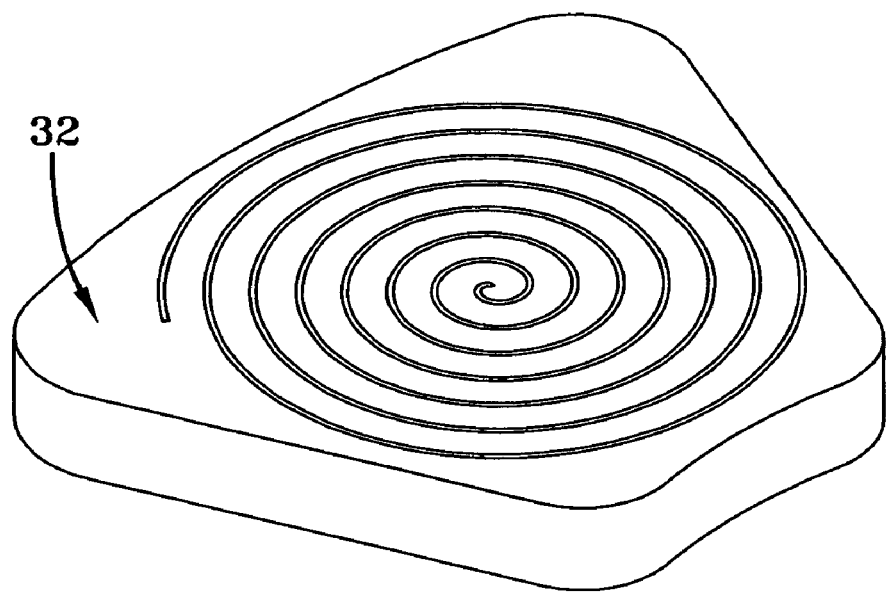
FIG. 4 is an isometric view of a brake lining assembly according to an aspect of the invention.
Figure 5:
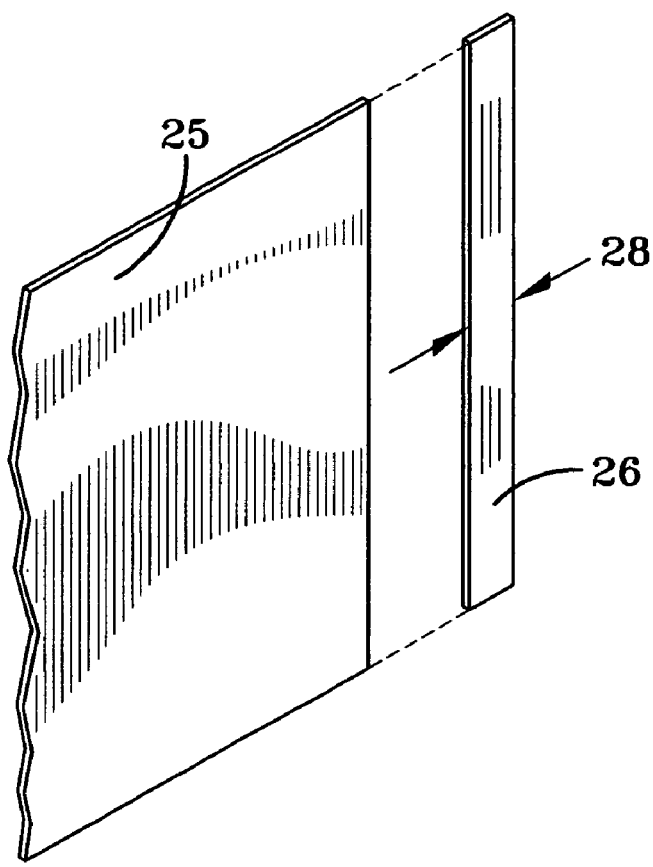
FIG. 5 is a top view of metal sheet stock, and a metal strip cut from the stock, according to an aspect of the invention.
Figure 6:
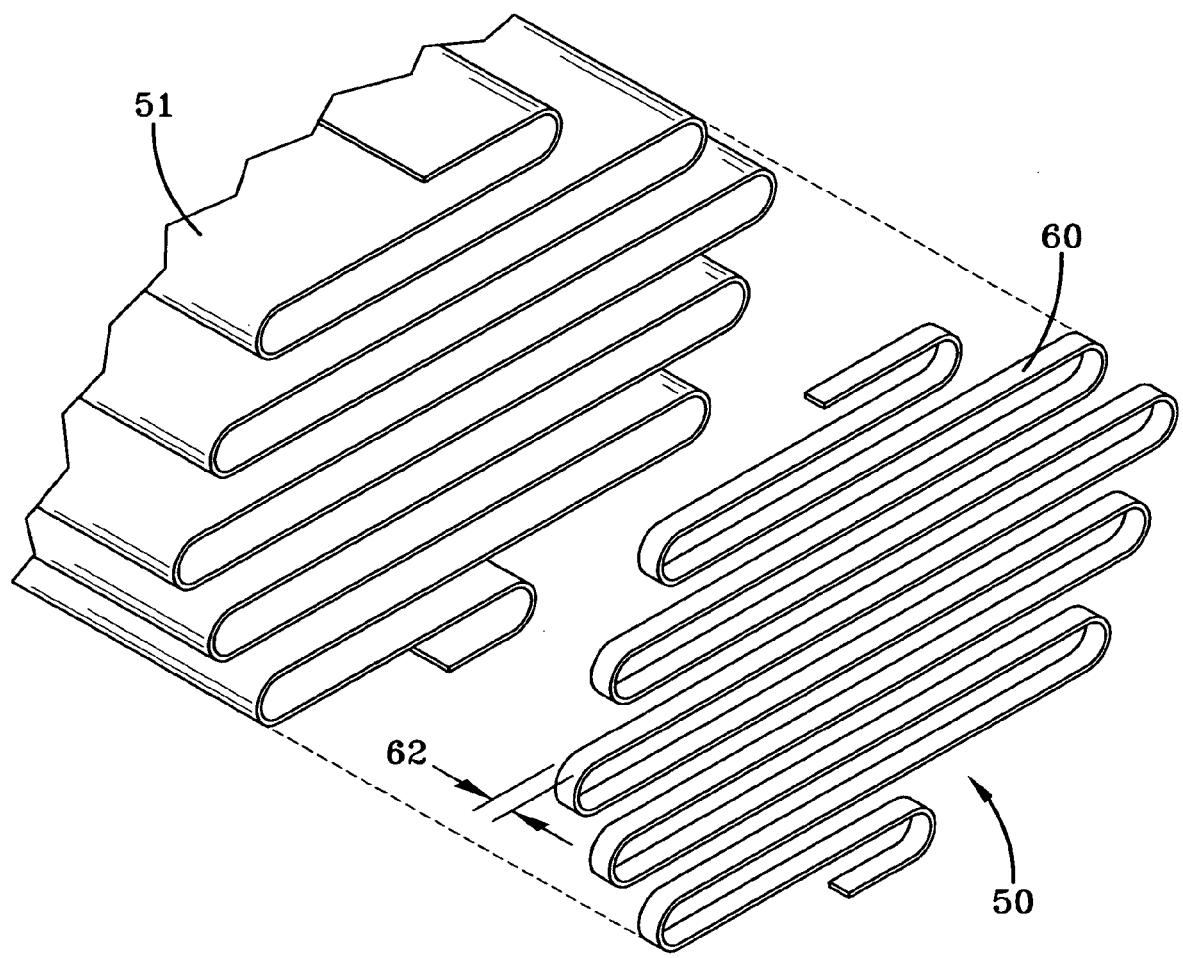
FIG. 6 is an isometric view of an extrusion, and a cut section of the extrusion according to an aspect of the invention.

Various aspects of the invention are presented in FIGS. 1–6 which are not drawn to scale and in which like components are numbered alike. Referring now to FIGS. 1–3, according to an aspect of the invention, a brake disk 10 has an annular disc 12, and a plurality of segmented brake lining cups 20 secured to the disc 10. These lining cups 20 are filled with brake lining material 22, forming a brake lining assembly 30. The brake lining assembly 30 has a wear surface 32. This is a fairly standard brake disk construction. The present invention improves this construction by reinforcing the brake lining material 22 with a metallic winding structure 24.

Prior art has reinforced the brake lining with grids, or honeycomb structures. These methods require assembly and bonding technologies to fasten the individual pieces together. Bond techniques for metallic reinforcements typically include brazing or welding. As a result, there is an overlap of material at the bond interface. The winding structure 24, however, is constructed from a single continuous piece. There is no overlap of material. The difference in manufacturability of these reinforcement approaches is clearly reflected in the price. It costs up to five times as much to reinforce a brake lining with a honeycomb configuration as it does to reinforce the lining with a winding structure 24.

According to an aspect of the invention, the metallic winding structure 24 is comprised of a metallic material with a thermal conductivity significantly above that of the brake lining material 22. In a preferred embodiment of the invention, the thermal conductivity of the metallic material of the metallic winding structure 24 is several times the thermal conductivity of the brake lining material 22. Thus the material for the metallic winding structure 24 will be selected based on the brake lining material 22. According to various aspects of the invention, the metallic winding structure 24 may be comprised of copper, or steel, or any other appropriate metallic material known in the art. In a preferred embodiment of the invention, the metallic winding structure 24 is comprised of electrolytic tough copper per UNS C110000.

According to an aspect of the invention the metallic winding structure 24 is comprised of a metallic material cut from sheet stock 25 and wound into shape. For example, if the brake lining depth 34 is approximately 1 inch, then a metal strip with a width 28 slightly less then 1 inch wide could be cut from a metal sheet stock, and bent into the desired shape.

According to a further aspect of the invention, the metallic winding structure 24 is comprised of a metallic material which has been extruded to the desired shape, and cut to the desired thickness. For example, if the desired shape of the reinforcement structure 24 is a sinuous geometry 50, then an appropriate metal is extruded into the appropriate sinuous geometry extrusion 51. This extrusion would then be sliced into sections 60 with a width 62 slightly less then the brake lining depth 34.

The winding geometries allows for less expensive manufacturing cost than the more complicated geometries of the honeycomb and the other grids which have been used before. Any continuous winding shape therefore is within the purview of this invention. Some preferred embodiments of winding geometry have the metallic winding structure 24 comprising a coil geometry 40, or a sinuous geometry 50.

In order to effectively improve the wear characteristics of the brake lining assembly 30, according to an aspect of the invention, the winding reinforcement structure 24 comprises at least 7% of the brake lining wear surface 32 area. The percentage of the brake lining wear surface 32 area that is comprised of the winding reinforcement structure 24 may be optimized by testing.

According to another aspect of the invention, a method of producing a brake lining assembly 30 having a wear surface 32 with increased wear characteristics comprises the steps of winding a metal strip 26, placing the wound metal strip 24 into a brake lining cup 20, filling the brake lining cup 20 with a brake lining material 22 of powdered metal and then sintering the powdered metal thus embedding the wound metal strip 24 into the brake lining material 22, forming a brake lining assembly 30. The metal strip 26 has a width 28 approximately equal to that of the brake lining material desired depth 34, and is wound into a shape and size which will fit into the brake lining cup 20. The wound metal strip 24 is then placed into the brake lining cup 20 such that the metal strip width 28 is approximately perpendicular to the brake lining wear surface 32.

The metal strip 26 may be hand wound. In a preferred embodiment, the metal strip 26 is fed into a forming die which produces the desired shape.

In a preferred embodiment of the invention the metal strip 26 is wound into a geometry which is selected to conduct maximum amount of heat from the brake lining wear surface 32 without adversely affecting lining performance. According to an aspect of the invention, the metal strip 26 is wound into a coil shape 40. According to a further aspect of the invention the metal strip 26 is wound into a sinuous shape 50.

A preferred embodiment of the invention further comprises grinding the brake lining assembly 30 to expose the wound metal strip 24 material.

According to another aspect of the invention a method of producing a brake lining assembly 30 having a wear surface 32 with increased wear characteristics, comprises the steps of extruding a metallic material into a wound shape of a size which will fit into said brake lining assembly 30, and cutting the extrusion into a section 60 with a width 62 equal to or slightly less than the brake lining assembly 30 desired depth 34. This method further comprises placing the extrusion section 60 into a brake lining cup 20, filling the brake lining cup 20 with a powdered metal 22, and sintering the powdered metal 22, thus embedding the extrusion section 60 into the brake lining material 22 forming a brake lining assembly 30.

In a preferred embodiment of the invention the metal strip 26 is extruded into a geometry which is selected to conduct maximum amount of heat from the brake lining wear surface 32 without adversely affecting lining performance. According to an aspect of the invention, the metal strip 26 is extruded into a coil shape 40. According to a further aspect of the invention the metal strip 26 is extruded into a sinuous shape 50.

A preferred embodiment of the invention further comprises grinding the brake lining assembly 30 to expose the extrusion section 60 material.

I claim:

1. A method of producing a reinforced brake lining assembly from a brake lining cup, brake lining material, and a metal reinforcement material, wherein said brake lining assembly has a wear surface, comprising the steps:
   winding a metal strip, with a width equal to that of the brake lining assembly desired depth, into a shape and size which will fit into said brake lining cup;
   placing said wound metal strip into a brake lining cup, such that said wound metal strip width is approximately perpendicular to the brake lining wear surface;
   filling said brake lining cup with a brake lining material of powdered metal; and,
   sintering said powdered metal, thus embedding said wound metal strip into said brake lining material, forming a brake lining assembly.

2. The method of claim 1 wherein said metal strip is wound into a geometry which is selected to conduct the maximum amount of heat from said brake lining wear surface without adversely affecting lining performance.

3. The method of claim 1 wherein said metal strip is wound into a coil shape.

4. The method of claim 1 wherein said metal strip is wound into a sinuous shape.

5. The method of claim 1 wherein said metal strip is comprised of copper.

6. The method of claim 1 wherein said metal strip is comprised of steel.

7. The method of claim 1 further comprising grinding the brake lining assembly to expose the metal strip material.

8. A method of producing a reinforced brake lining assembly from a brake lining cup, brake lining material, and a metal reinforcement material, wherein said brake lining assembly has a wear surface comprising the steps:
   extruding a metallic material, forming an extrusion, into a wound shape of a size which will fit into said brake lining cup;
   cutting said extrusion into an extrusion section with a width equal to or slightly less than the brake lining assembly desired depth;
   placing said extrusion section into a brake lining cup;
   filling said brake lining cup with a brake lining material of powdered metal: and,
   sintering said powdered metal, thus embedding said extrusion section into said brake lining material.

9. The method of claim 8 wherein said metallic material is extruded into a geometry which is selected to conduct maximum amount of heat from surface without adversely affecting lining friction.

10. The method of claim 8 wherein said metallic material is extruded into a coil shape.

11. The method of claim 8 wherein said metallic material is extruded into a sinuous shape.

12. The method of claim 8 wherein said metallic material is comprised of copper.

13. The method of claim 8 wherein said metallic material is comprised of steel.

14. The method of claim 8 further comprising grinding the brake lining assembly to expose said metallic material of said extrusion section.

* * * * *